March 1, 1966  M. N. TROTTER  3,237,593
AUTOMATIC CONTROL MEANS FOR CONTROLLING THE LEVEL IN A SIZE BOX
Filed Jan. 19, 1962
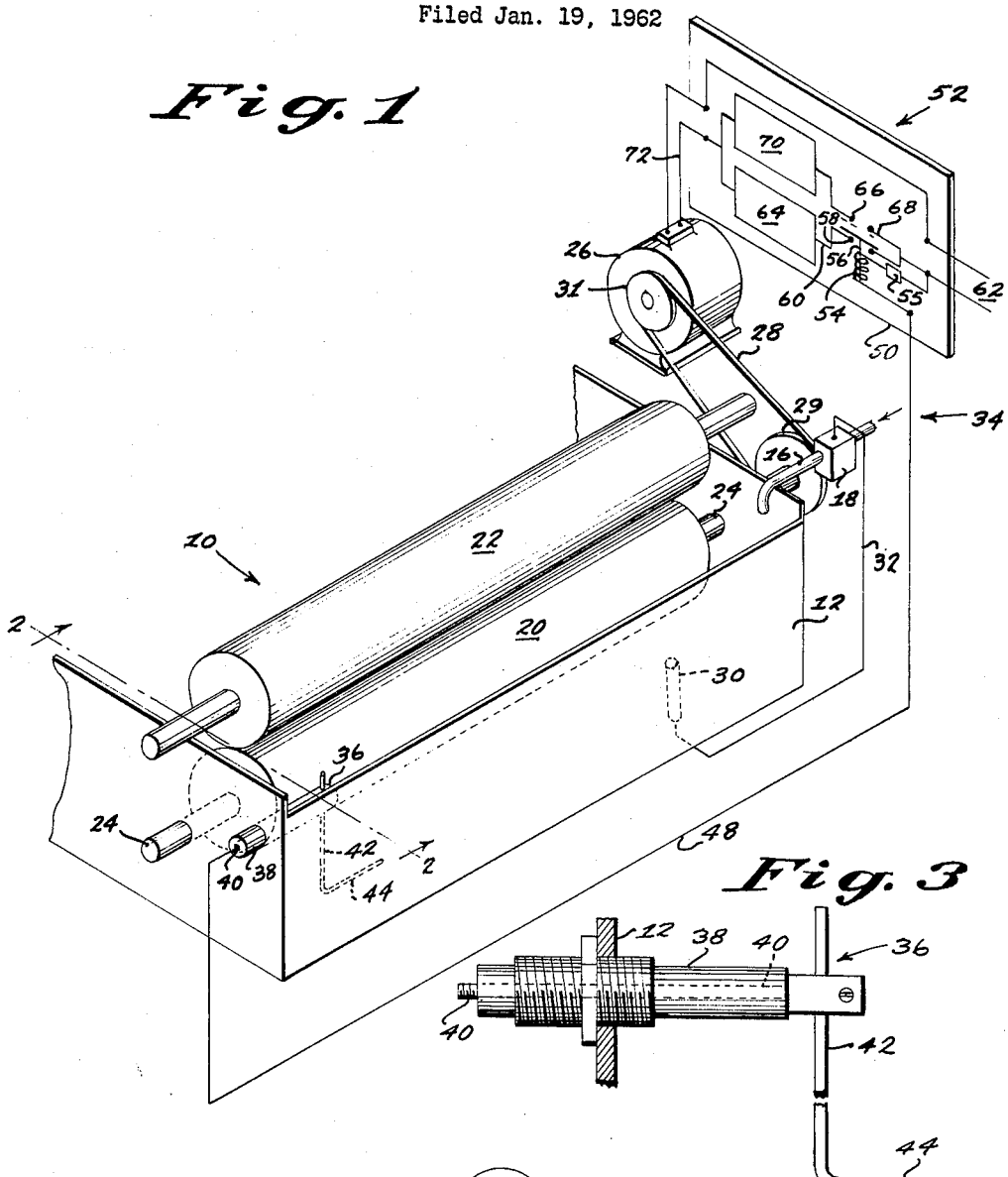
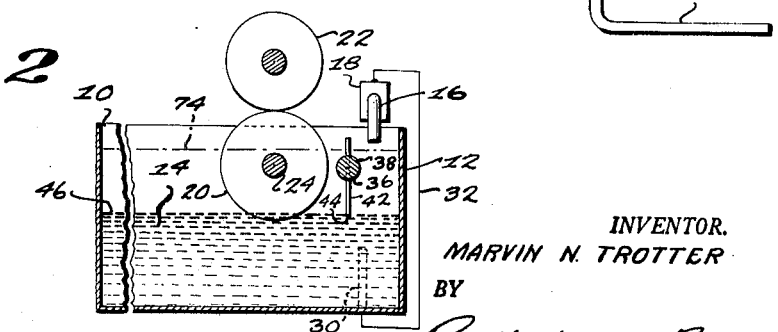
INVENTOR.
MARVIN N. TROTTER
BY
Parrott, Shefte & Rankin
ATTORNEYS

United States Patent Office 3,237,593
Patented Mar. 1, 1966

3,237,593
AUTOMATIC CONTROL MEANS FOR CONTROLLING THE LEVEL IN A SIZE BOX
Marvin N. Trotter, Anderson, S.C., assignor to J. P. Stevens & Co., Inc., a corporation of Delaware
Filed Jan. 19, 1962, Ser. No. 167,349
4 Claims. (Cl. 118—7)

The present invention relates to automatic control means for controlling the operation of an applicating device, such as a size box or similar apparatus, and more particularly to control means that automatically reduce the speed of operation of an applicating device in response to the detection of a minimum level of a supply of applicating material so as to reduce further depletion of the supply below the minimum level.

In applicating devices, such as textile size boxes, wherein material is applied to a traveling sheet by transfer means that pick up the material from a supply and transfer it to the traveling sheet, it is important that the pick-up be continuous to avoid untreated areas in the traveling sheet. This continuity may be interrupted if the level of the supply drops below the transfer means. For example, when using a roller that is partially immersed in the supply to pick up material therefrom, it is important that the level of the supply remain above an effective minimum level above the bottom of the roller.

By the present invention means are provided for automatically reducing the speed of operation when the supply of applicating material has been depleted to a predetermined minimum level. As the rate of transfer, and therefore the rate of depletion, is proportional to the rate of operation of the device, the reduction in operating speed results in a corresponding reduction in the rate of depletion of the supply. Preferably, material is fed to the supply, either continuously or intermittently in response to detection of the minimum or some other supply level at a rate greater than the reduced transfer rate resulting from the automatic operation of the present control means so that at the reduced speed of operation the supply level will rise to a level at which the device can again be run at normal operating speed.

The control of feeding of material to the supply may be independent of the control means of the present invention, in which case the present invention serves as a safeguard so that if, for any reason, the feed control means fails to operate or for any other reason, sufficient material is not fed to the supply to avoid a drop in the supply level below an effective minimum, the device will automatically be slowed to low speed operation with a corresponding reduction in the rate of depletion of the supply. This slowing down of the rate of depletion provides time for the operator or the applicating device itself to correct or compensate for the operating defect before the supply level drops below the transfer means and breaks the continuity of application.

Alternatively, the control means of the present invention may be constructed to actuate directly the feed of material to the supply simultaneously with the actuation of the reduction in operating speed, thereby immediately initiating a raising of the level simultaneously with the detection of the minimum level.

In the preferred embodiment of the present invention the automatic control means are incorporated in a yarn sizing apparatus of the type wherein a sheet of warp yarns travels through the nip of a pair of squeeze rolls that transfer size from a supply bath to the yarns by partial immersion in the bath of one of the squeeze rolls or another roll that transfers size to one of the squeeze rolls. The bath is replenished continuously or intermittently by a conventional control sensitive to the amount of size in the bath. A drive motor rotates at least one of the squeeze rolls with the speed of the motor being controlled by electrical control means that include a high speed circuit for high speed rotation of the rolls and a low or creep speed circuit for low speed rotation of the rolls, with means for selectively energizing either the high speed circuit or the low speed circuit. The automatic control means includes an electrical probe element that extends into the bath to a predetermined low level that is slightly above the bottom of the partially immersed roll, and detects when the level drops below this predetermined low level. The probe is electrically connected to the means for selecting the high speed or low speed circuits so that when the level of the bath is above the predetermined low level the probe is grounded in the bath and the high speed circuit is energized, but when the level of the bath drops below the probe the ground connection is broken, de-energizing the high speed circuit and energizing the low speed circuit, thereby reducing the speed of the roll from high speed to low speed. This reduction in speed reduces the rate at which the size is transferred from the bath by the partially immersed roll and permits the operator or the size feeding control to make adjustments to cause the level of the bath to begin rising before the level drops below the bottom of the partially immersed roll.

As the level of the size bath rises the probe is again covered by the size and the ground contact is re-established. However, to permit the bath level to rise to a safe operating level it is preferable that the high speed circuit is not re-energized by this ground contact, but is later re-energized manually by the operator or automatically by a control when the bath level has reached a desired operating level.

With the incorporation of the present invention in a yarn sizing apparatus the apparatus will automatically and without attention of the operator slow down when the level of size reaches the predetermined low level, which slow down is apparent to the operator, who can readily make the necessary adjustments to prevent a further drop in the size level and thereby can maintain continuous application of size to the web, eliminating entirely the occurrence of undesirable untreated or "soft" warps.

Other and further features and advantages of the present invention will be apparent from the following description and drawings, in which:

FIG. 1 is a diagrammatic view of the preferred embodiment of the automatic control means of the present invention incorporated in a sizing apparatus;

FIG. 2 is a vertical sectional view taken along line 2—2 of FIG. 1; and

FIG. 3 is an enlarged view of the electrical probe element of FIG. 1.

The preferred embodiment of the present invention is shown in the figures incorporated in a sizing apparatus 10. However, as the complete details of the sizing apparatus are not pertinent to the present invention, only those elements of the apparatus that cooperate with or function with the control means of the present invention are shown in the drawings.

In FIGS. 1 and 2 the sizing apparatus 10 is seen to comprise a container 12 or size box in which a bath 14 of size solution is contained. Size is fed to the container 12 through a conduit 16 leading from a supply (not shown) with a valve 18 located in the conduit 16 to control the feed of size to the bath 14.

The apparatus 10 is designed to apply size from the bath 14 to a traveling sheet of warp yarns by means of a pair of squeeze rolls 20, 22 which form a nip through which the yarn is drawn. The bottom squeeze roll 20 is rotatably mounted within the container 12 on a shaft 24 that is mounted on the sizing apparatus 10 in any conventional manner (not shown). This bottom roll 20 is partially immersed in the bath 14 of size to pick up size and carry it to the yarn at the nip of the rolls. The top squeeze roll 22 creates a pressure at the nip of the rolls to squeeze the yarn and thereby control the amount of pick-up. This top roll 22 is also mounted on the sizing apparatus 10 in any conventional manner. The bottom squeeze roll 20 is driven by an electric motor 26 drivingly attached to the bottom roll shaft 24 by a chain 28 and sprockets 29, 31 to drive the squeeze rolls at a rate corresponding to the speed of the motor 26.

As the bottom squeeze roll transfers size from the bath 14 to the yarn, the level of the bath decreases. To replenish the size and to maintain the size bath level with in desirable operating limits means are provided to operate the size feed valve 18 in response to the level of the bath. For example, a so-called "bubbler" 30 may be employed, which is submerged in the bath 14 and emits air at a predetermined rate. The back pressure against the air indicates the height of the size bath 14 above the "bubbler" 30 and thus the device can detect selected low and high levels and through the lead line 32 operate the opening and closing of the feed valve 18 to feed size to the bath to maintain the level within the selected limits.

The above described elements of the sizing apparatus 10 are of generally conventional construction and it is in this conventional construction that the automatic control means, indicated generally by the numeral 34, of the present invention are incorporated, as will now be described in detail.

An electrical probe element 36 is mounted in the wall of the container 12 with an insulated body portion 38 through which a conducting element 40 extends. Attached to the conducting element 40 is an L-shaped low level detecting finger 42 that extends downwardly and has a horizontal bottom portion 44 at a predetermined low level 46 slightly above the bottom of the bottom squeeze roll 20. This low level 46 should be such that when operating at this level the bottom squeeze roll 20 will still pick up adequate size from the bath 14 to apply a desired amount to the traveling yarn.

The electrical probe element 36 is connected by lead line 48 to a control relay 50 that is part of control means 52 that control the squeeze roll drive motor 26. The control means 52 includes a holding coil 54 connected in series with the lead line 48 from the probe 36, for operation of a solenoid switch 56. This switch 56 is movable from contacts 58 in a line 60 connecting an electrical power line 62 and a high speed circuit 64 to contacts 66 in a line 68 connecting the power line 62 and a low speed or creep speed circuit 70 for selectively and alternately closing and opening these circuits 64 and 70.

The holding coil 54 is connected to the power line 62 through a transformer 55 that steps down the voltage in the probe circuit, primarily for safety as the size bath itself is part of this circuit, as will be described, and high voltage would be dangerous to the operator.

The high speed circuit 64 and low speed circuit 70 are connected in parallel and are connected through common lead line 72 to the drive motor 26 for operation of the drive motor 26 and bottom squeeze roll 20 at high speed or creep speed, depending upon which circuit is energized.

When the level of the bath 14 is above the bottom portion 44 of the low level detecting finger 42 of the electrical probe element 36 the bath 14 serves as an electrical ground, permitting current to flow through the holding coil 54, control relay 50, lead line 48 and probe element 36. This energizing of the holding coil 54 positions the solenoid switch 56 in contact with the high speed circuit contacts 58, energizing the high speed circuit 64 to operate the drive motor 26 and bottom squeeze roll 20 at high speed.

When the level of the bath 14 drops below the bottom portion 44 of the low level detecting finger 42 of the electrical probe element 36 the ground connection between the probe element 36 and the bath 14 is broken and current does not flow through the holding coil 54. The solenoid switch 50 is constructed to move from the high speed circuit contacts 58 to the low speed circuit contacts 66 when the holding coil 54 is de-energized, thus, de-energizing the high speed circuit 64 and energizing the low speed or creep speed circuit 70 to change the speed of the drive motor 26 and the bottom squeeze roll 20 to creep speed.

The operator readily notices the change from high speed to creep speed and can manually operate the control of the feed valve 18 to begin feeding size into the bath before the size level drops below the bottom of the bottom squeeze roll 20. The rate of feed of size into the bath should be greater than the rate at which the size is transferred from the bath to the sheet at creep speed so that the quantity of size in the bath will increase, thereby raising the level of size.

As the size level rises to the predetermined low level 46 and again contacts the bottom portion 44 of the probe 36 the ground contact from the probe 36 through the bath 14 is again established, thereby energizing the holding coil 54, but this alone does not cause the solenoid switch 56 to break contact with the low speed line 68 and return to the high speed line 60. Thus slow speed operation will continue permitting the size bath level to rise.

When a desired high level, such as that indicated at 74, is reached the operator can manually operate the solenoid switch 56 to move it from the low speed contact 66 to the high speed contact 58 for resumption of high speed operation. The holding coil 54 holds the solenoid switch 56 in the high speed position until the level of size again drops below the probe 36, which results in the holding coil 54 being de-energized to permit the solenoid switch 56 to move to the low speed contacts 66 for low speed operation of the sizing apparatus 10.

The operation of the solenoid switch 56 from the low speed position to the high speed position could be accomplished through automatic controls sensitive to the detection of a predetermined high level. Also, the probe 36 could be connected to the feed valve control 18 to automatically begin feeding of size when the low level is detected, rather than relying on manual operation by the operator.

It should be noted that the present invention is not intended to be limited to the specific sizing apparatus environment described above or to the particular electrical circuitry. Also the invention is not limited to an intermittent size feed system as it could be adapted to an apparatus wherein the solution is continuously fed to the bath. Also it should be noted that a plurality of rolls could be substituted for the bottom applicator roll 20, for example, one roll could be immersed in the bath and apply the solution to a second roll which in turn would apply the solution to the traveling web of yarn or other material. The present invention has been described in detail above for purposes of illustration only and is not intended to be limited by this description or otherwise except as defined in the appended claims.

I claim:

1. In a yarn sizing apparatus or similar device wherein size or other solution is applied to a traveling sheet by a rotating applicator roll that is partially immersed in a bath of solution and rotates in contact with the sheet with electrical control means controlling the speed of operation and having a high speed circuit and a low speed circuit, automatic control means comprising an electrical probe element connected to the electrical control means and extending into the bath to a predetermined low level, said probe element being electrically grounded in the bath when the level of the bath is above the low level to energize the high speed circuit of the control means for high speed operation, and said ground connection being broken when the level of the bath falls below the low level to de-energize the high speed circuit and energize the low speed circuit.

2. Automatic control means according to claim 1 and characterized further in that said electrical probe element does not automatically re-energize the high speed circuit when the bath rises to the probe element and establishes ground connection.

3. A yarn sizing apparatus or similar device wherein size or other solution is applied to a traveling sheet comprising a container for holding a bath of solution, a rotating applicator roll that is partially immersed in the bath of solution and said container and which rotates in contact with the sheet to apply the solution, and an electric control means for controlling the speed of operation of the apparatus comprising an electrical probe element extending into the bath of solution in said container to a predetermined level, a high speed circuit for operating the apparatus at a high speed for normal operation, a low speed circuit for operating the apparatus at a low speed for refilling the bath in said container, said electrical probe element being connected to said high and low speed circuits to alternately energize said circuits according to the level of the bath in said container.

4. A yarn sizing apparatus, as set forth in claim 3, in which, said high speed circuit is energized when said electrical probe element is grounded in the bath in said container due to the level of the bath being above said pre-determined level of said electrical probe element, and said low level circuit is energized when said electrical probe element is not grounded in the bath in said container due to the level of the bath being below said predetermined level of said electrical probe element.

References Cited by the Examiner
UNITED STATES PATENTS

| | | | |
|---|---|---|---|
| 2,123,227 | 7/1938 | Bieling | 118—6 |
| 2,841,111 | 7/1958 | Walker | 118—7 |
| 2,981,638 | 4/1961 | Jones | 118—7 |

MORRIS KAPLAN, *Primary Examiner.*

RICHARD D. NEVIUS, *Examiner.*